US012305447B2

(12) United States Patent
Hyma et al.

(10) Patent No.: US 12,305,447 B2
(45) Date of Patent: May 20, 2025

(54) INCREASED AND IMPROVED FUNCTIONALITY FOR A LADDER

(71) Applicant: Milwaukee Electric Tool Corporation, Brookfield, WI (US)

(72) Inventors: Steven W. Hyma, Milwaukee, WI (US); Christopher S. Hoppe, Cedarburg, WI (US); Grant T. Squiers, Cudahy, WI (US); Michael Stearns, Milwaukee, WI (US); Aaron M. Williams, Milwaukee, WI (US); Benjamin T. Jones, St. Francis, WI (US); Adam M. Moller, Brookfield, WI (US); Connor J. McTaggart, Elm Grove, WI (US); Aaron S. Blumenthal, Shorewood, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 620 days.

(21) Appl. No.: 17/010,612

(22) Filed: Sep. 2, 2020

(65) Prior Publication Data

US 2021/0062579 A1 Mar. 4, 2021

Related U.S. Application Data

(60) Provisional application No. 62/908,243, filed on Sep. 30, 2019, provisional application No. 62/895,220, filed on Sep. 3, 2019.

(51) Int. Cl.

| | |
|---|---|
| ***E06C 1/20*** | (2006.01) |
| ***E06C 7/00*** | (2006.01) |
| ***E06C 7/14*** | (2006.01) |

(52) U.S. Cl.

CPC .................. *E06C 1/20* (2013.01); *E06C 7/00* (2013.01); *E06C 7/14* (2013.01); *E06C 7/003* (2013.01)

(58) Field of Classification Search

CPC ..... E06C 1/20; E06C 1/18; E06C 7/00; E06C 7/14; E06C 7/003; E06C 7/181;

(Continued)

(56) References Cited

U.S. PATENT DOCUMENTS 2,865,546 A * 12/1958 Shull .......................... E06C 7/14 182/125

3,106,987 A * 10/1963 Lerner ...................... E06C 7/14 182/126

(Continued)

FOREIGN PATENT DOCUMENTS

| | | |
|---|---|---|
| DE | 202014103695 | 12/2014 |
| EP | 1724069 A2 | 11/2006 |

(Continued)

OTHER PUBLICATIONS

Inter Partes Review No. 2024-01400, "Petition for Inter Partes Review of U.S. Pat. No. 11,365,026" Filed Sep. 17, 2024, 147 pages.

(Continued)

*Primary Examiner* — Jessica L Laux
*Assistant Examiner* — Kathleen M. McFarland
(74) *Attorney, Agent, or Firm* — Reinhart Boerner Van Deuren s.c.

(57) ABSTRACT

A ladder is provided. The ladder includes coupling components that couple modular storage elements to the ladder. The ladder includes various components to facilitate moving, carrying, and placing the ladder.

3 Claims, 10 Drawing Sheets

(58) Field of Classification Search
CPC ....... E06C 7/50; E06C 7/182; B65D 21/0223; B65D 21/0224; B65D 43/163
See application file for complete search history.

(56) References Cited

U.S. PATENT DOCUMENTS

| | | | | | |
|---|---|---|---|---|---|
| 3,424,334 | A | 1/1969 | Goltz | | |
| 4,653,713 | A * | 3/1987 | Hamilton | B25H 3/02 | D32/53.1 |
| 4,703,833 | A * | 11/1987 | Bachman | E06C 7/14 | 248/238 |
| 5,098,052 | A * | 3/1992 | Beck | E06C 7/14 | 248/238 |
| 5,505,302 | A * | 4/1996 | Ferley | B25H 3/02 | 248/210 |
| 5,782,314 | A * | 7/1998 | Zeitler | E06C 7/14 | 248/210 |
| 5,890,613 | A | 4/1999 | Williams | | |
| 5,913,380 | A * | 6/1999 | Gugel | E06C 7/14 | 248/210 |
| 5,941,344 | A * | 8/1999 | Spadaro | E06C 7/14 | 248/210 |
| 5,950,972 | A * | 9/1999 | Irish | E06C 7/14 | 248/210 |
| 6,443,260 | B1 * | 9/2002 | Katz | E06C 7/14 | 248/238 |
| 6,983,946 | B2 | 1/2006 | Sullivan et al. | | |
| 7,032,711 | B1 * | 4/2006 | Katz | B25H 3/06 | 248/238 |
| 7,178,633 | B2 * | 2/2007 | Angotti | E06C 7/14 | 248/210 |
| 7,264,084 | B1 * | 9/2007 | Switzer | E06C 7/14 | 248/238 |
| D600,820 | S * | 9/2009 | Gomez Lopez | E06C 7/14 | D25/68 |
| 7,789,198 | B2 * | 9/2010 | Myers | E06C 7/50 | 224/265 |
| 8,186,481 | B2 * | 5/2012 | Moss | E06C 7/50 | 182/25 |
| 8,272,478 | B2 * | 9/2012 | Astor | E06C 7/14 | 248/238 |
| 8,381,875 | B2 * | 2/2013 | Leng | E06C 7/087 | 182/180.1 |
| 8,453,796 | B2 * | 6/2013 | Astor | E06C 7/00 | 182/119 |
| 8,579,083 | B2 * | 11/2013 | Astor | E06C 7/14 | 182/115 |
| 8,596,454 | B1 * | 12/2013 | Carlson | B25H 3/06 | 248/210 |
| 8,636,144 | B1 * | 1/2014 | Lawery | E06C 7/14 | 220/570 |
| 8,740,010 | B1 | 6/2014 | Page | | |
| 8,770,778 | B2 * | 7/2014 | Pereira | E06C 7/14 | 362/127 |
| 8,925,683 | B1 * | 1/2015 | Gunsaullus | E06C 1/38 | 182/129 |
| 9,016,434 | B2 * | 4/2015 | Moss | E06C 1/39 | 182/180.1 |
| 9,359,818 | B1 * | 6/2016 | Gunsaullus | E06C 5/00 | |
| 9,359,819 | B1 * | 6/2016 | Valadez | E06C 7/14 | |
| 9,375,835 | B1 | 6/2016 | Lin | | |
| 9,534,443 | B1 * | 1/2017 | Bogart | E06C 7/46 | |
| 9,714,542 | B1 * | 7/2017 | Harcz | E06C 7/14 | |
| 9,920,572 | B2 * | 3/2018 | Moss | E06C 1/18 | |
| 10,041,297 | B2 * | 8/2018 | Austin | E06C 7/00 | |
| 10,184,292 | B2 * | 1/2019 | Latimer | E06C 1/18 | |
| 10,358,832 | B1 * | 7/2019 | Wagner | E04G 5/003 | |
| 10,583,962 | B2 | 3/2020 | Brunner et al. | | |
| 10,750,833 | B2 | 8/2020 | Burchia | | |
| 11,560,755 | B1 * | 1/2023 | Kuzmin | E06C 1/397 | |
| 2002/0104709 | A1 * | 8/2002 | Hines | B25H 3/006 | 182/129 |
| 2003/0139080 | A1 | 7/2003 | Lafragette et al. | | |
| 2006/0070806 | A1 * | 4/2006 | Simpson | E06C 7/14 | 182/129 |
| 2007/0138041 | A1 | 6/2007 | Welsh | | |
| 2007/0181366 | A1 * | 8/2007 | Astor | E06C 7/14 | 182/129 |
| 2007/0227817 | A1 * | 10/2007 | Myers | E06C 7/50 | 182/129 |
| 2007/0284191 | A1 * | 12/2007 | Astor | E06C 7/14 | 182/129 |
| 2009/0078504 | A1 * | 3/2009 | Astor | E06C 1/39 | 182/129 |
| 2009/0229918 | A1 * | 9/2009 | Moss | E06C 7/14 | 182/180.1 |
| 2011/0024232 | A1 * | 2/2011 | Leng | E06C 7/50 | 182/116 |
| 2011/0155613 | A1 * | 6/2011 | Koenig | B65D 21/0223 | 206/503 |
| 2011/0260588 | A1 | 10/2011 | Lin | | |
| 2012/0217093 | A1 * | 8/2012 | Latimer | E06C 7/14 | 182/129 |
| 2013/0127129 | A1 | 5/2013 | Bensman et al. | | |
| 2013/0128557 | A1 * | 5/2013 | Pereira | E06C 7/14 | 362/145 |
| 2014/0083888 | A1 * | 3/2014 | Constable | E06C 7/14 | 206/349 |
| 2014/0265440 | A1 | 9/2014 | Chen et al. | | |
| 2016/0215561 | A1 * | 7/2016 | Austin | E06C 7/14 | |
| 2016/0348434 | A1 * | 12/2016 | Williams | E06C 7/14 | |
| 2017/0058602 | A1 * | 3/2017 | Cureton | E06C 7/14 | |
| 2017/0081918 | A1 * | 3/2017 | Ahner | B25H 3/02 | |
| 2017/0166352 | A1 | 6/2017 | Hoppe et al. | | |
| 2018/0023345 | A1 * | 1/2018 | Andrade | A47B 5/04 | 108/25 |
| 2018/0238113 | A1 * | 8/2018 | Wulfekotte | E06C 7/16 | |
| 2019/0078385 | A1 * | 3/2019 | Moss | E06C 1/397 | |
| 2019/0225371 | A1 | 7/2019 | Hoppe et al. | | |
| 2020/0147781 | A1 | 5/2020 | Squiers et al. | | |
| 2020/0165036 | A1 | 5/2020 | Squiers et al. | | |
| 2023/0122425 | A1 | 4/2023 | Camp et al. | | |

FOREIGN PATENT DOCUMENTS

| | | | |
|---|---|---|---|
| EP | 2537641 | B1 | 9/2016 |
| EP | 2338650 | B1 | 10/2016 |
| GB | 2211486 | | 7/1989 |
| WO | WO2014/125484 | | 8/2014 |

OTHER PUBLICATIONS

Exhibit 1001 in "Petition for Inter Partes Review of U.S. Pat. No. 11,365,026" Filed Sep. 17, 2024, 66 pages.
Exhibit 1002 in "Petition for Inter Partes Review of U.S. Pat. No. 11,365,026" Filed Sep. 17, 2024, 324 pages.
Exhibit 1003 in "Petition for Inter Partes Review of U.S. Pat. No. 11,365,026" Filed Sep. 17, 2024, 139 pages.
Exhibit 1004 in "Petition for Inter Partes Review of U.S. Pat. No. 11,365,026" Filed Sep. 17, 2024, 17 pages.
Exhibit 1005 in "Petition for Inter Partes Review of U.S. Pat. No. 11,365,026" Filed Sep. 17, 2024, 9 pages.
Exhibit 1006 in "Petition for Inter Partes Review of U.S. Pat. No. 11,365,026" Filed Sep. 17, 2024, 21 pages.
Exhibit 1007 in "Petition for Inter Partes Review of U.S. Pat. No. 11,365,026" Filed Sep. 17, 2024, 16 pages.
Exhibit 1008 in "Petition for Inter Partes Review of U.S. Pat. No. 11,365,026" Filed Sep. 17, 2024, 31 pages.
Exhibit 1009 in "Petition for Inter Partes Review of U.S. Pat. No. 11,365,026" Filed Sep. 17, 2024, 6 pages.
Exhibit 1010 in "Petition for Inter Partes Review of U.S. Pat. No. 11,365,026" Filed Sep. 17, 2024, 4 pages.
Exhibit 1011 in "Petition for Inter Partes Review of U.S. Pat. No. 11,365,026" Filed Sep. 17, 2024, 16 pages.
Exhibit 1012 in "Petition for Inter Partes Review of U.S. Pat. No. 11,365,026" Filed Sep. 17, 2024, 8 pages.
Exhibit 1013 in "Petition for Inter Partes Review of U.S. Pat. No. 11,365,026" Filed Sep. 17, 2024, 19 pages.

(56) References Cited

OTHER PUBLICATIONS

Exhibit 1014 in "Petition for Inter Partes Review of U.S. Pat. No. 11,365,026" Filed Sep. 17, 2024, 35 pages.
Exhibit 1015 in "Petition for Inter Partes Review of U.S. Pat. No. 11,365,026" Filed Sep. 17, 2024, 11 pages.
Exhibit 1016 in "Petition for Inter Partes Review of U.S. Pat. No. 11,365,026" Filed Sep. 17, 2024, 193 pages.
Exhibit 1017 in "Petition for Inter Partes Review of U.S. Pat. No. 11,365,026" Filed Sep. 17, 2024, 29 pages.
Exhibit 1018 in "Petition for Inter Partes Review of U.S. Pat. No. 11,365,026" Filed Sep. 17, 2024, 15 pages.
Exhibit 1019 in "Petition for Inter Partes Review of U.S. Pat. No. 11,365,026" Filed Sep. 17, 2024, 19 pages.
Exhibit 1020 in "Petition for Inter Partes Review of U.S. Pat. No. 11,365,026" Filed Sep. 17, 2024, 18 pages.
Exhibit 1021 in "Petition for Inter Partes Review of U.S. Pat. No. 11,365,026" Filed Sep. 17, 2024, 313 pages.
Exhibit 1030 in "Petition for Inter Partes Review of U.S. Pat. No. 11,365,026" Filed Sep. 17, 2024, 95 pages.
Exhibit 1031 in "Petition for Inter Partes Review of U.S. Pat. No. 11,365,026" Filed Sep. 17, 2024, 5 pages.
Exhibit 1032 in "Petition for Inter Partes Review of U.S. Pat. No. 11,365,026" Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in "Petition for Inter Partes Review of U.S. Pat. No. 11,794,952" Filed Sep. 17, 2024, 67 pages.
Exhibit 1002 Part 1 in "Petition for Inter Partes Review of U.S. Pat. No. 11,794,952" Filed Sep. 17, 2024, 227 pages.
Exhibit 1002 Part 2 in "Petition for Inter Partes Review of U.S. Pat. No. 11,794,952" Filed Sep. 17, 2024, 278 pages.
Exhibit 1003 in "Petition for Inter Partes Review of U.S. Pat. No. 11,794,952" Filed Sep. 17, 2024, 168 pages.
Exhibit 1004 in "Petition for Inter Partes Review of U.S. Pat. No. 11,794,952" Filed Sep. 17, 2024, 17 pages.
Exhibit 1005 in "Petition for Inter Partes Review of U.S. Pat. No. 11,794,952" Filed Sep. 17, 2024, 9 pages.
Exhibit 1006 in "Petition for Inter Partes Review of U.S. Pat. No. 11,794,952" Filed Sep. 17, 2024, 21 pages.
Exhibit 1007 in "Petition for Inter Partes Review of U.S. Pat. No. 11,794,952" Filed Sep. 17, 2024, 16 pages.
Exhibit 1008 in "Petition for Inter Partes Review of U.S. Pat. No. 11,794,952" Filed Sep. 17, 2024, 31 pages.
Exhibit 1009 in "Petition for Inter Partes Review of U.S. Pat. No. 11,794,952" Filed Sep. 17, 2024, 6 pages.
Exhibit 1010 in "Petition for Inter Partes Review of US Pat. No. 11,794, 952" Filed Sep. 17, 2024, 4 pages.
Exhibit 1011 in "Petition for Inter Partes Review of U.S. Pat. No. 11,794,952" Filed Sep. 17, 2024, 16 pages.
Exhibit 1012 in "Petition for Inter Partes Review of U.S. Pat. No. 11,794,952" Filed Sep. 17, 2024, 8 pages.
Exhibit 1013 in "Petition for Inter Partes Review of U.S. Pat. No. 11,794,952" Filed Sep. 17, 2024, 19 pages.
Exhibit 1014 in "Petition for Inter Partes Review of US Pat. No. 11,794, 952" Filed Sep. 17, 2024, 35 pages.
Exhibit 1015 in "Petition for Inter Partes Review of U.S. Pat. No. 11,794,952" Filed Sep. 17, 2024, 11 pages.
Exhibit 1016 in "Petition for Inter Partes Review of US Pat. No. 11,794, 952" Filed Sep. 17, 2024, 193 pages.
Exhibit 1017 in "Petition for Inter Partes Review of U.S. Pat. No. 11,794,952" Filed Sep. 17, 2024, 29 pages.
Exhibit 1018 in "Petition for Inter Partes Review of U.S. Pat. No. 11,794,952" Filed Sep. 17, 2024, 15 pages.
Exhibit 1019 in "Petition for Inter Partes Review of U.S. Pat. No. 11,794,952" Filed Sep. 17, 2024, 19 pages.
Exhibit 1020 in "Petition for Inter Partes Review of U.S. Pat. No. 11,794,952" Filed Sep. 17, 2024, 18 pages.
Exhibit 1021 in "Petition for Inter Partes Review of U.S. Pat. No. 11,794,952" Filed Sep. 17, 2024, 313 pages.
Exhibit 1022 in "Petition for Inter Partes Review of U.S. Pat. No. 11,794,952" Filed Sep. 17, 2024, 324 pages.
Exhibit 1023 in "Petition for Inter Partes Review of U.S. Pat. No. 11,794,952" Filed Sep. 17, 2024, 5 pages.
Exhibit 1024 in "Petition for Inter Partes Review of US Pat. No. 11,794, 952" Filed Sep. 17, 2024, 7 pages.
Exhibit 1025 in "Petition for Inter Partes Review of U.S. Pat. No. 11,794,952" Filed Sep. 17, 2024, 15 pages.
Exhibit 1026 in "Petition for Inter Partes Review of U.S. Pat. No. 11,794,952" Filed Sep. 17, 2024, 37 pages.
Exhibit 1027 in "Petition for Inter Partes Review of U.S. Pat. No. 11,794,952" Filed Sep. 17, 2024, 7 pages.
Exhibit 1028 in "Petition for Inter Partes Review of U.S. Pat. No. 11,794,952" Filed Sep. 17, 2024, 33 pages.
Exhibit 1030 in "Petition for Inter Partes Review of U.S. Pat. No. 11,794,952" Filed Sep. 17, 2024, 95 pages.
Exhibit 1031 in "Petition for Inter Partes Review of U.S. Pat. No. 11,794,952" Filed Sep. 17, 2024, 5 pages.
Exhibit 1032 in "Petition for Inter Partes Review of U.S. Pat. No. 11,794,952" Filed Sep. 17, 2024, 60 pages.

* cited by examiner

INCREASED AND IMPROVED FUNCTIONALITY FOR A LADDER

CROSS-REFERENCE TO RELATED PATENT APPLICATION

The present application claims the benefit of and priority to U.S. Provisional Application No. 62/908,243, filed Sep. 30, 2019, and U.S. Provisional Application No. 62/895,220, filed Sep. 3, 2019, both of which are incorporated herein by reference in their entireties.

BACKGROUND OF THE INVENTION

The present disclosure is directed generally to the field of ladders. The present disclosure relates specifically to a ladder with increased and/or improved functionality.

Ladders are often used to facilitate accessing higher locations and to hold equipment. Components of a ladder may provide varying functions, such as being support users, tools and/or inventory.

SUMMARY OF THE INVENTION

One embodiment of the invention relates to a ladder configured to couple to a stackable storage unit, the ladder including a top shelf including an upper surface, a coupling component extending from the upper surface of the top shelf, the coupling component configured to couple the upper surface of the top shelf to the stackable storage unit, a pair of front legs pivotally coupled to the top shelf, a plurality of steps extending between the pair of front legs, and a pair of back legs pivotally coupled to the top shelf.

In a specific embodiment the ladder also includes a platform pivotally coupled to the pair of front legs, the platform including an upper surface, and a second coupling component extending from the upper surface of the platform, the second coupling component configured to couple the upper surface of the platform to the stackable storage unit. In a specific embodiment the ladder also includes a padding coupled to a leg of one of the pair of front legs or one of the pair of back legs.

Another embodiment of the invention relates to a ladder configured to couple to a stackable storage unit, the ladder including a top shelf, a pair of front legs pivotally coupled to the top shelf, a plurality of steps extending between the pair of front legs, a pair of back legs pivotally coupled to the top shelf, a support bar extending between the pair of back legs, a tray pivotally coupled to the support bar, the tray actuating between an open position and a closed position, and a slide slidably coupled to the tray. The slide actuates between a first position in which the slide interfaces with the support bar to restrict the tray from pivoting from the closed position to the open position, and a second position in which the slide no longer interfaces with the support bar to restrict the tray from pivoting to the open position.

Another embodiment of the invention relates to a ladder configured to couple to a stackable storage unit, the ladder including a top shelf, a pair of front legs pivotally coupled to the top shelf, a plurality of steps extending between the pair of front legs, a pair of back legs pivotally coupled to the top shelf, a support bar extending between the pair of back legs, a pair of locking supports that extend between the pair of front legs and the pair of back legs, and a handle that extends between the pair of locking supports.

One embodiment of the invention relates to a ladder that is configured to be coupled to a modular storage unit.

Another embodiment of the invention relates to a ladder with measuring indicia extending along at least one of the legs. Another embodiment of the invention relates to relates to a ladder with handles and/or pads to facilitate carrying the ladder. Another embodiment of the invention relates to relates to a ladder with mounts and/or cleats coupled to the ladder. Another embodiment of the invention relates to ladder that includes a rail extending along at least one of the legs to which a device can be mounted.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION

Referring generally to the figures, depicted is one or more ladders with increased and/or improved functionality. Applicant has discovered that increasing the functionality of a ladder can improve the productivity of the worker(s) using the ladder. The ladder(s) described herein provide various improvements to the field of ladders.

Figure 1:
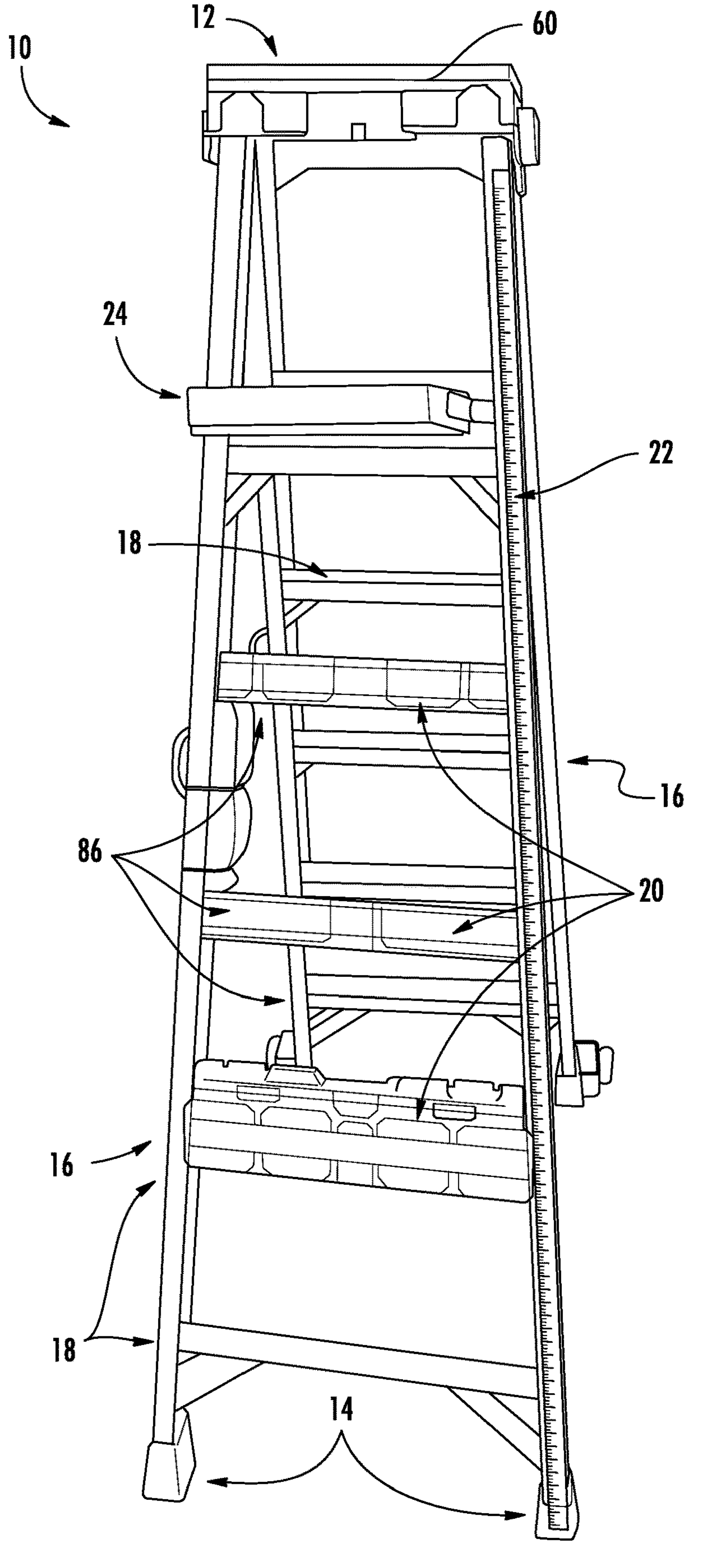
FIG. 1 is a perspective view of a ladder, according to an exemplary embodiment.
Figure 2:
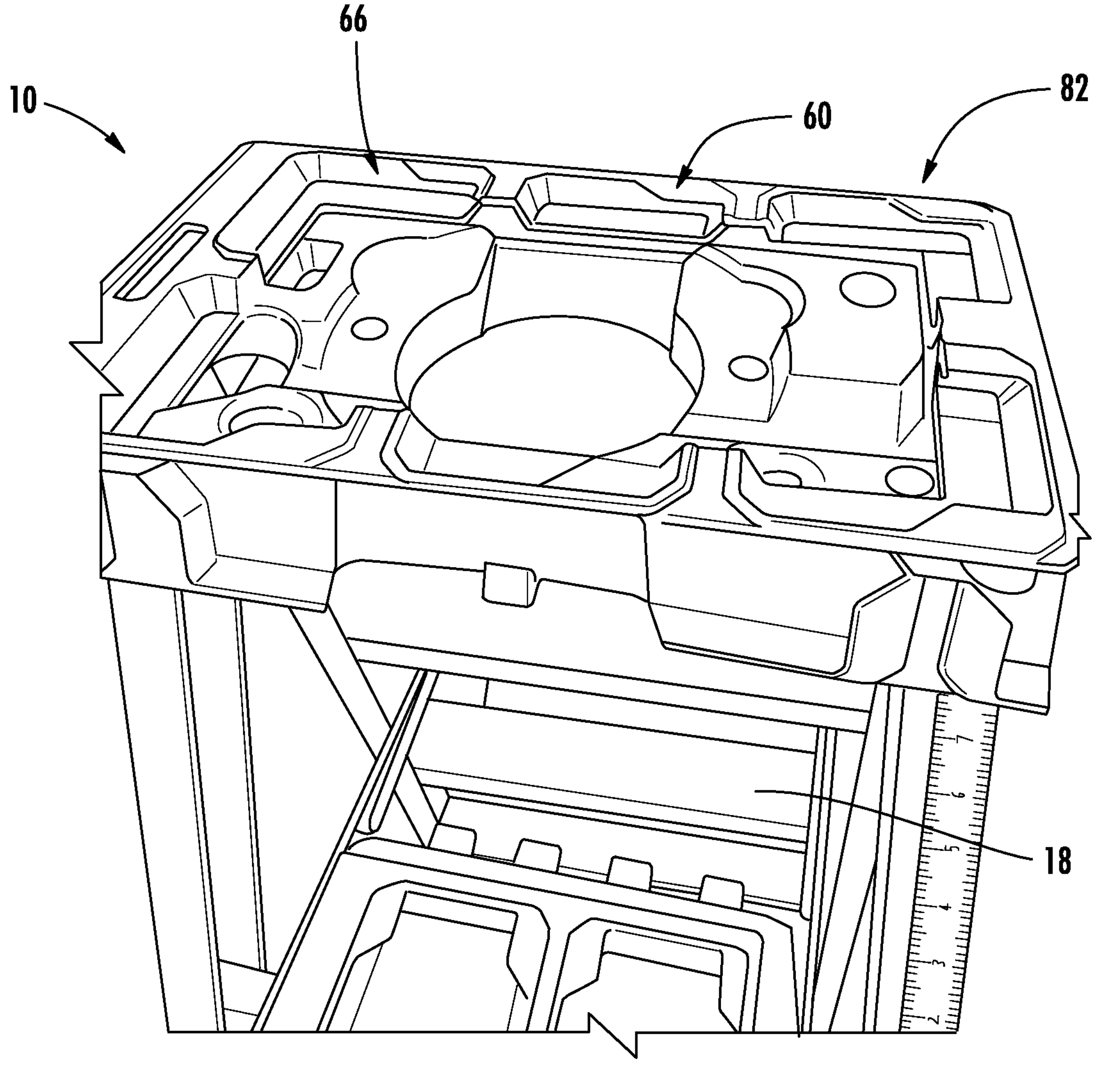
FIG. 2 is a perspective view of the ladder of FIG. 1, according to an exemplary embodiment.
Figure 3:
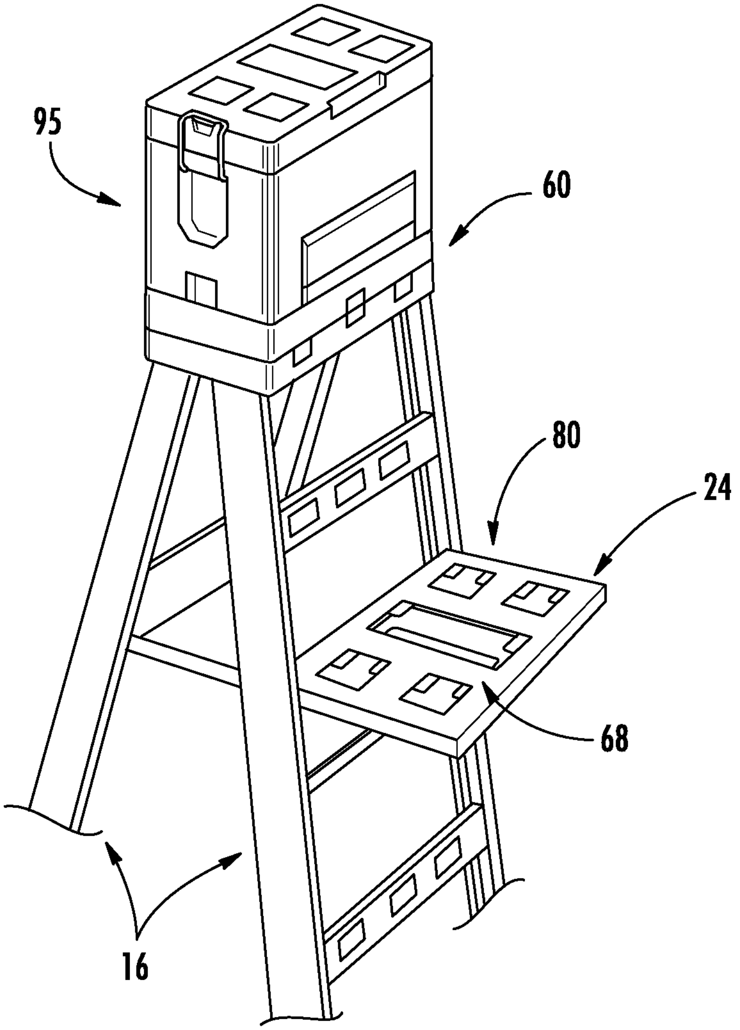
FIG. 3 is a schematic view of the ladder of FIG. 1, according to an exemplary embodiment.
Figure 4:
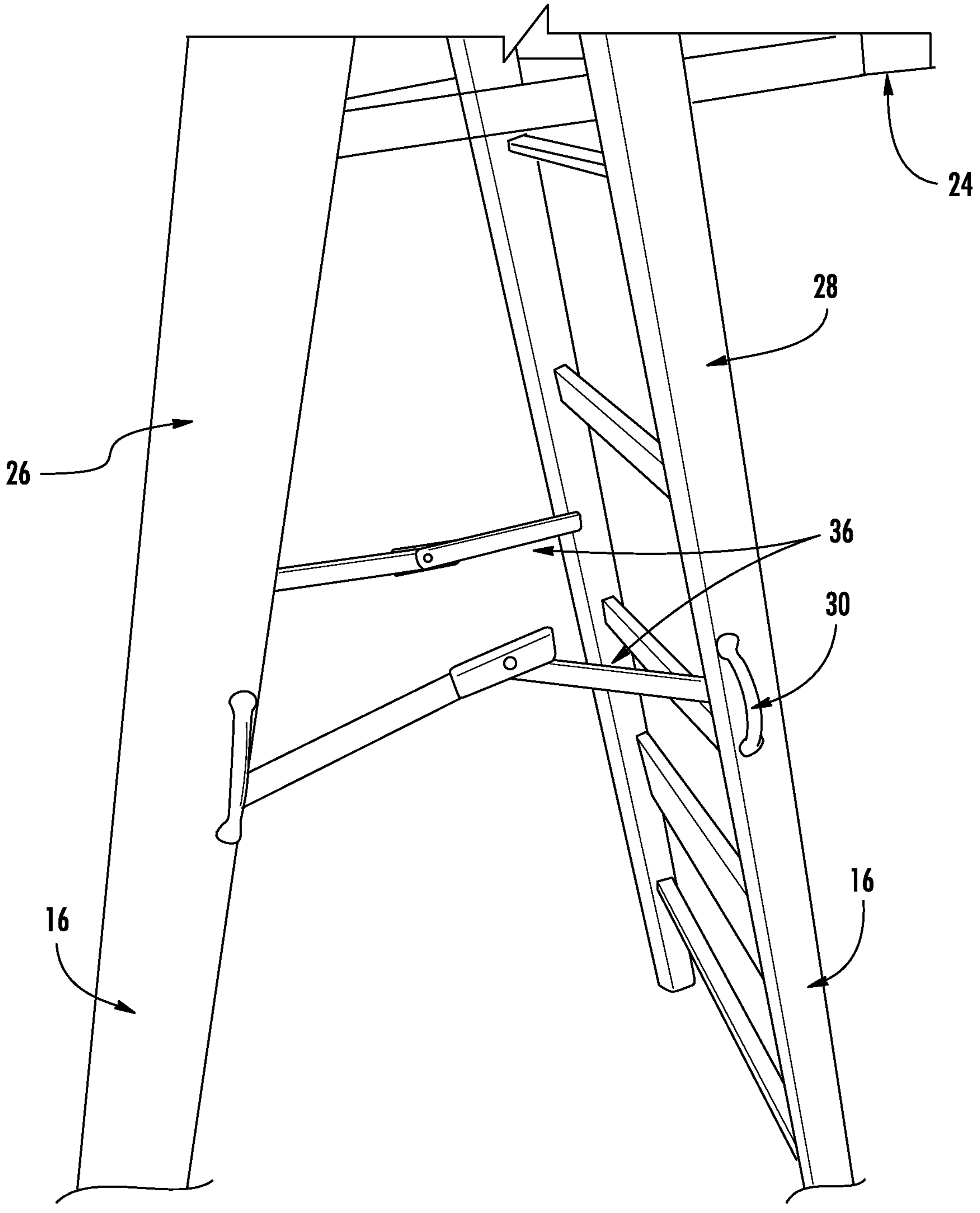
FIG. 4 is a perspective view of the ladder of FIG. 1, according to an exemplary embodiment.
Figure 5:
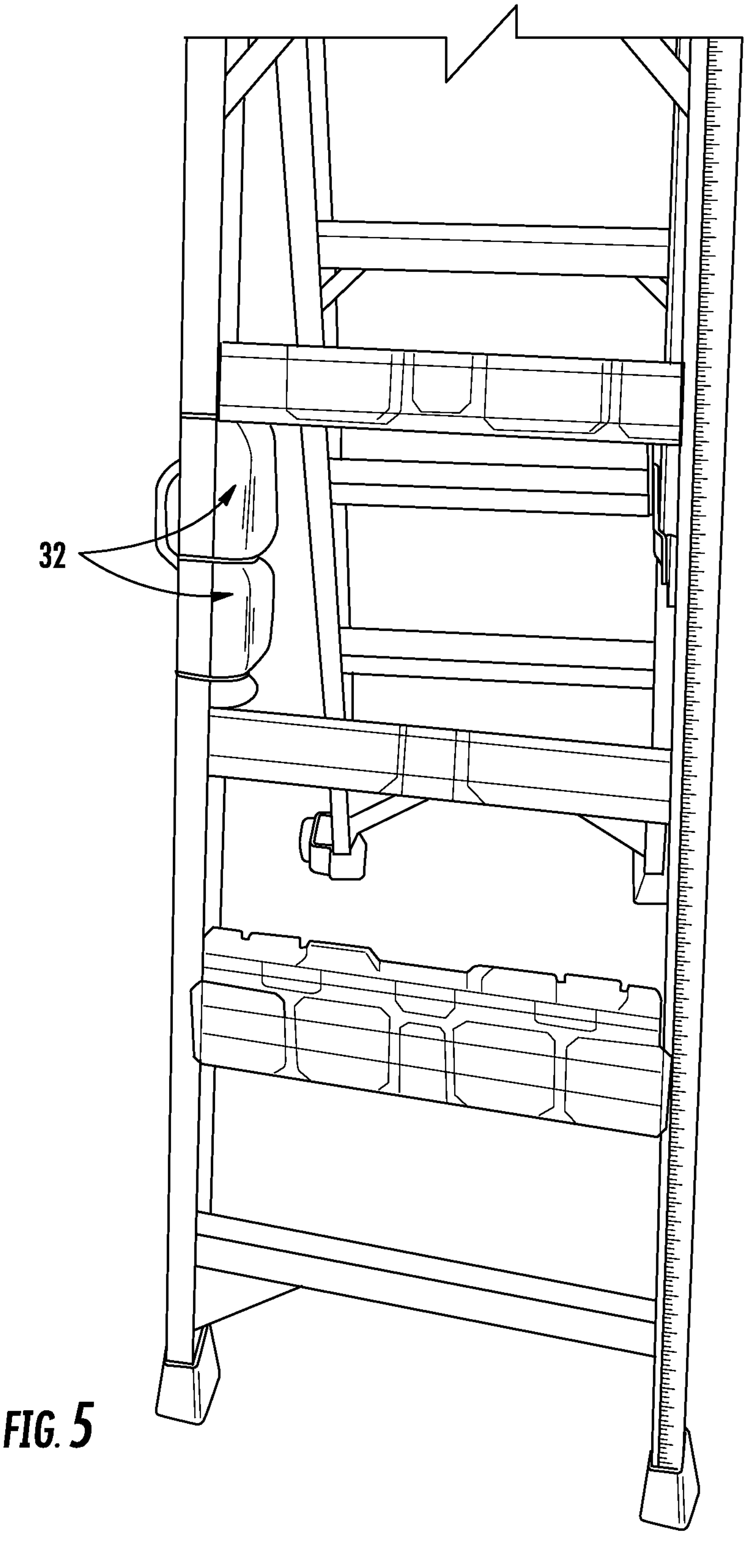
FIG. 5 is a perspective view of the ladder of FIG. 1, according to an exemplary embodiment.
Figure 6:
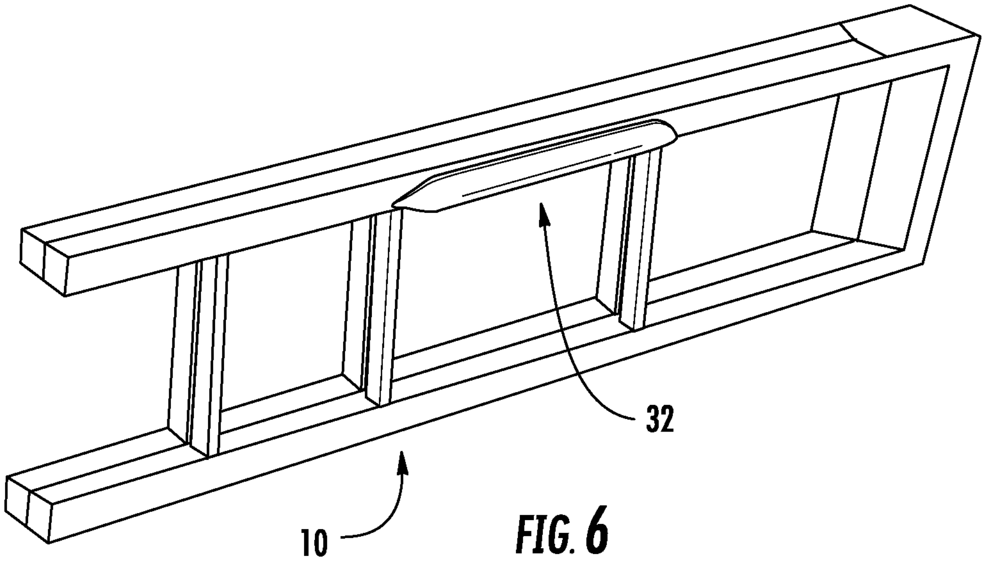
FIG. 6 is a schematic view of the ladder of FIG. 1, according to an exemplary embodiment.

Referring to FIGS. 1-3, a movable structure, shown as ladder 10, is shown according to an exemplary embodiment. Ladder 10 includes two pairs of collapsible legs 16. A platform, shown as shelf 24, is pivotally connected to one pair of legs 16. Measuring indicia 22 extends generally from bottom 14 to top 12 of ladder 10. Support bars 20 extend between at least one of the pairs of legs 16. Steps 18 similarly extend between at least one of the pairs of legs 16. One or more of support bars 20 include third interface 86 that is configured to couple with storage units, such as modular storage units. In a specific embodiment, a pair of front legs 16 are pivotally coupled to top shelf 60, an opposing pair of back legs 16 are pivotally coupled to top shelf, steps 18 extend between the pair of front legs 16, and support bars 20 extend between the pair of back legs 16.

Top shelf 60 is coupled to ladder 10 at or near top 12. Top shelf 60 includes upper surface 66. Second interface 82 extends from upper surface 66 and is configured to couple with a bottom surface of a storage units, such as modular storage unit 95. Additionally, top shelf 60 includes tool storage slots and holes for holding tools.

Shelf 24 includes upper surface 68. First interface 80 extends from upper surface 68 and is configured to couple with storage units, such as modular storage units.

Turning to FIGS. 4-7, ladder 10 includes carrying handles 30 that can be used to move ladder 10. For example, if safe, handles 30 can be used to move ladder 10 while ladder 10 is deployed (e.g., locking support 36 between legs 16 is fully extended and ladder 10 is upright). Handles 30 can also be used while ladder 10 is collapsed and oriented generally parallel to the ground. Handles 30 are fixedly coupled to at least one of lateral faces 26 and 28 of legs 16.

Figure 7:
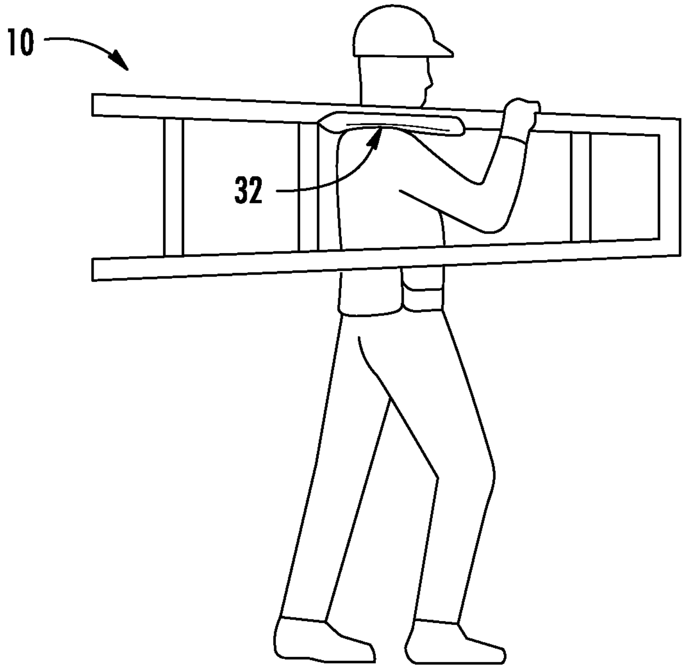
FIG. 7 is a schematic view of the ladder of FIG. 1, according to an exemplary embodiment.

Ladder 10 also includes padding, shown as pads 32, that can be used to move ladder 10. As shown in FIG. 7, pads 32 can be used to support ladder 10 on a user's shoulders.

Figure 8:
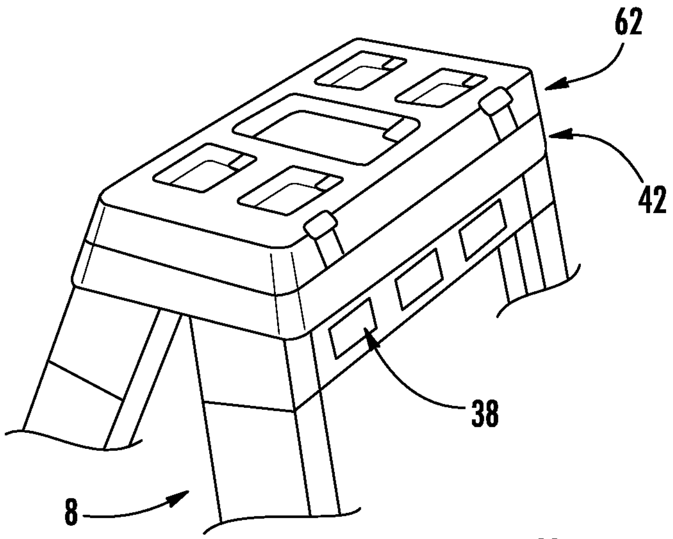
FIG. 8 is a schematic view of a ladder, according to an exemplary embodiment.
Figure 9:
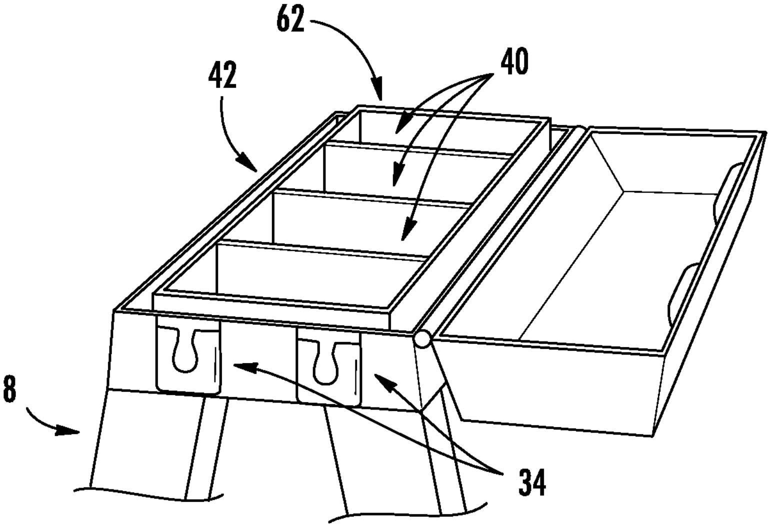
FIG. 9 is a schematic view of the ladder of FIG. 8, according to an exemplary embodiment.
Figure 10:
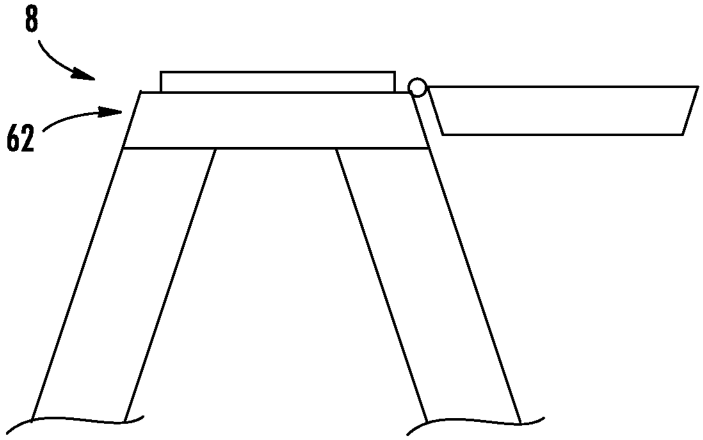
FIG. 10 is a schematic view of the ladder of FIG. 8, according to an exemplary embodiment.

Turning to FIGS. 8-10, ladder 8 is shown. Ladder 8 is substantially the same as ladder 10 except for the differences discussed herein. Ladder 8 includes storage unit 62 and housing 42, which are coupled to the top end 12 of legs 16. Housing 42 defines storage compartments 40 for storing tools, equipment and inventory. Mounts 34 provide a coupling mechanism to connect containers, such as bags, that have a corresponding coupler. Mounts 34 are coupled to the side of storage unit 64. Cleats 38 are also coupled to a side of storage unit. Cleats 38 provide an additional coupling mechanism. As shown in FIGS. 8-10, cleats 38 and mounts 34 are coupled to different sides of storage unit 64. In an alternate embodiment, one or more cleats 38 and one or more mounts 34 are coupled to a same side of storage unit 62.

Figure 11:
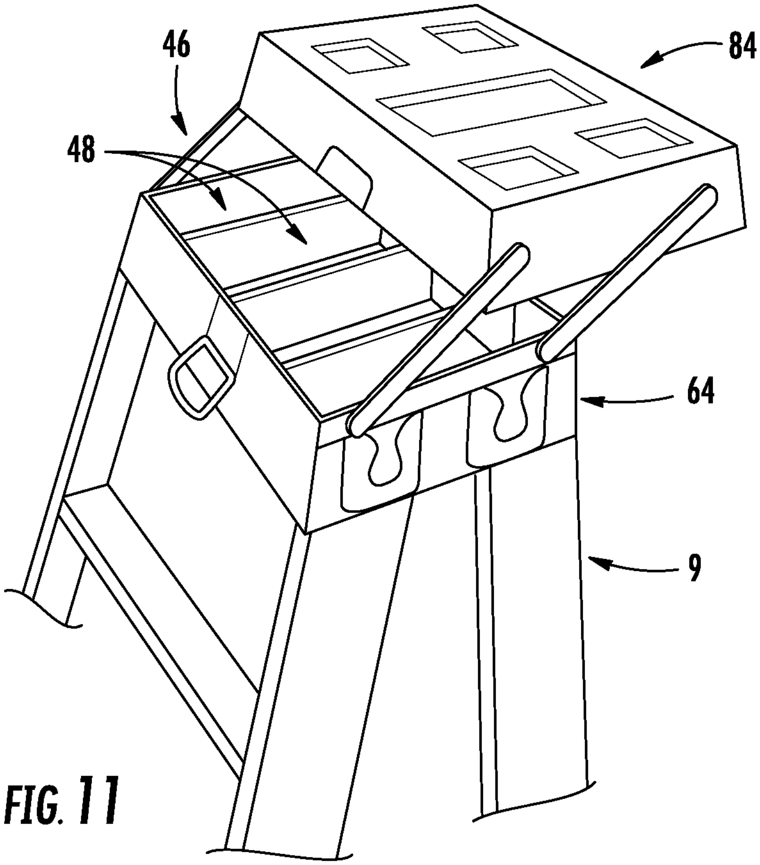
FIG. 11 is a perspective view of a ladder, according to an exemplary embodiment.
Figure 12:
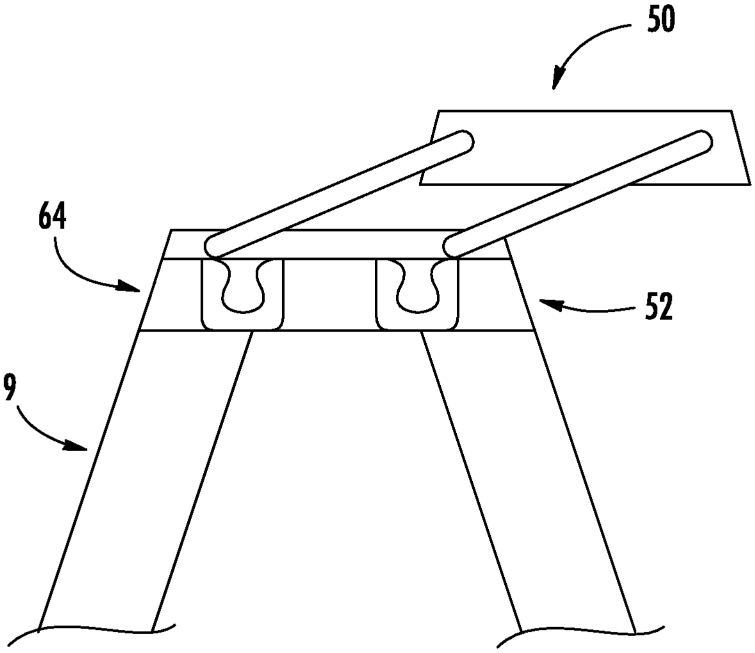
FIG. 12 is a side views of the ladder of FIG. 11, according to an exemplary embodiment.

Turning to FIGS. 11-12, ladder 9 is shown. Ladder 9 is substantially the same as ladder 8 and ladder 10 except for the differences discussed herein. Ladder 9 includes storage unit 64 that is coupled to the top end of legs 16. Upper housing 50 is pivotally coupled to lower housing 52 via support bars 46. As shown, four (4) support bars 46 pivotally couple upper housing 50 and lower housing 52. Lower housing 52 at least partially defines storage compartments 48 for storing tools, equipment and inventory. Upper housing 50 actuates with respect to lower housing 52, permitting access to compartments 48 when upper housing 50 is moved away from lower housing 52, and restricting access to compartments 48 when upper housing 50 is disposed above and interfacing with lower housing 52. The top of upper housing 50 includes third interface 84

In specific embodiments, interfaces 80, 82, 84, and 86 couple to a modular storage unit via an interface compatible with the coupling mechanism(s) described in International Patent Application No. PCT/US2018/044629.

In a specific embodiment, a rail or a slot extends along at least one of legs 16. The rail or slot provides a continuous mounting location to couple a device. For example, a level, such as a laser level, can be coupled along the rail or slot. In a specific embodiment a single leg 16 includes a rail or slot to which a laser level can be coupled. In another specific embodiment, two or more legs include a rail or slot to which devices can be coupled. In yet another embodiment, a ferrous or magnetic strip is coupled to one or more of the legs. A device, such as a laser level with a magnetic coupling component (e.g., a magnetic mount) is used to couple a device to the strip.

Figure 13:
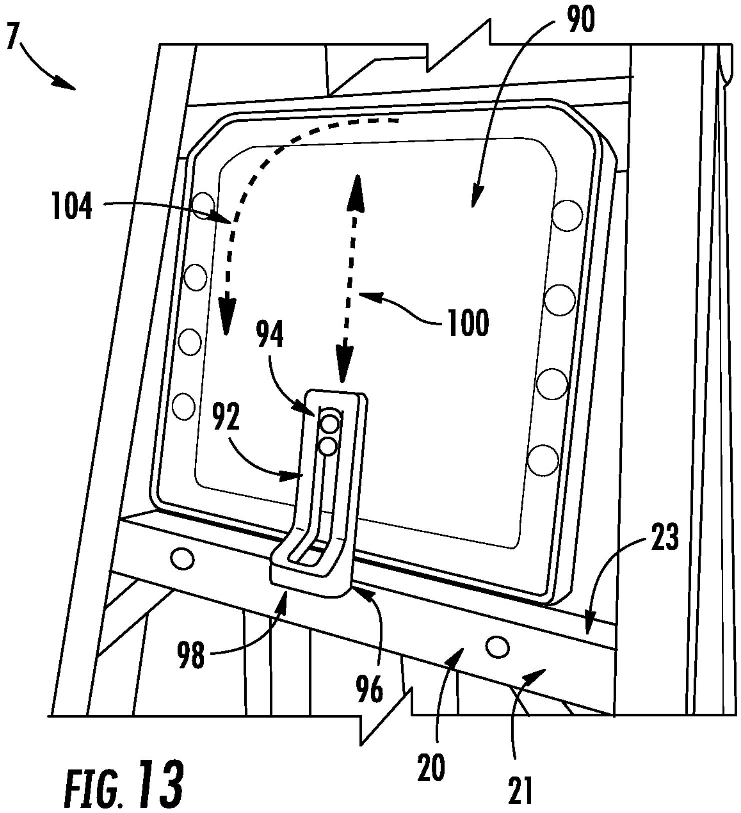
FIG. 13 is perspective view of a ladder, according to an exemplary embodiment.
Figure 14:
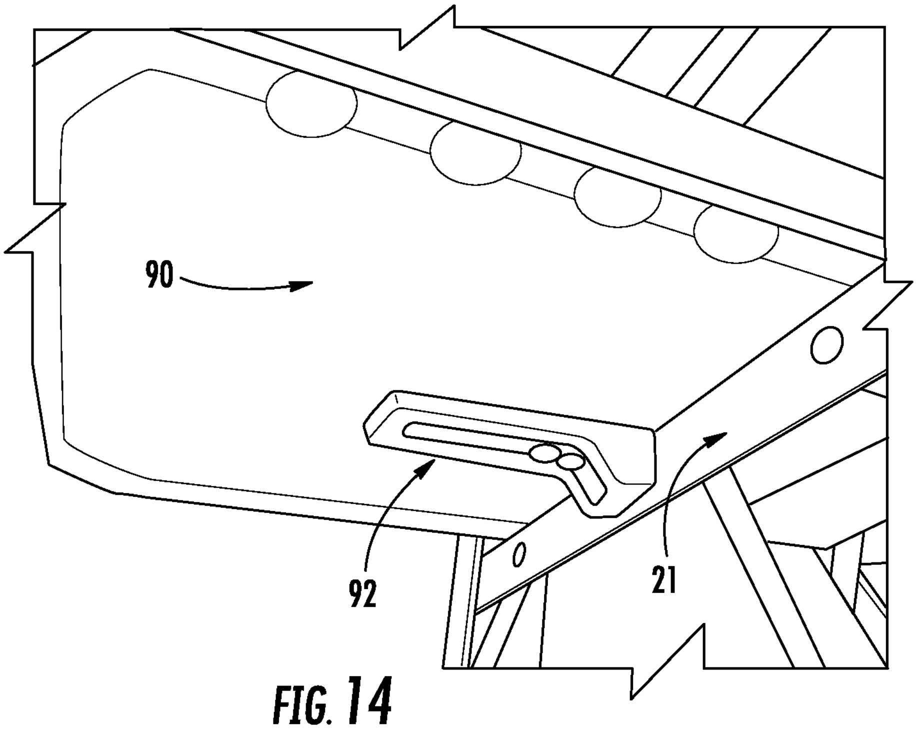
FIG. 14 is perspective view of the ladder of FIG. 13, according to an exemplary embodiment.

Turning to FIGS. 13-14, different aspects of ladder 7 are shown. Ladder 7 is substantially the same as ladder 8, ladder 9, and ladder 10 except for the differences discussed herein. Ladder 7 includes a platform, shelf, or support structure, shown as tray 90, that is pivotally coupled to support bar 20. Tray 90 actuates between an open position and a closed position. When placed in the lowered position as shown in FIG. 14, tray 90 can be used to support tools, equipment and/or inventory. Slide 92 is slidably coupled to tray 90 via fasteners 94. Slide 92 actuates between a locked position and an unlocked position with respect to tray 90.

When slide 92 is in a locked position (FIG. 13), top surface 96 of slide 92 interfaces against lateral surface 21 of support bar 20 to restrict tray 90 from pivoting open in direction 104 from the closed position to the open position. Slide 92 is moved upward from the perspective of FIG. 13 along longitudinal axis 100 until slide 92 is in the unlocked position, until slide 92 no longer interfaces against support bar 20 to restrict tray 90 from being transitioned from the closed or raised position (FIG. 13) to the open or lowered position (FIG. 14), such as for example when end surface 98 of slide 92 moves near or above top surface 23 of support bar 20.

Slide 92 is coupled to tray 90 via fasteners 94, which extend through aperture 102 in slide 92. Aperture 102 permits fasteners 94 to slide along axis 100 between the locking position in FIG. 13, and an unlocked position.

In one or more embodiments top surface of tray 90 has a similar and/or the same interface as one of interfaces 80, 82, 84, and/or 86.

Figure 15:
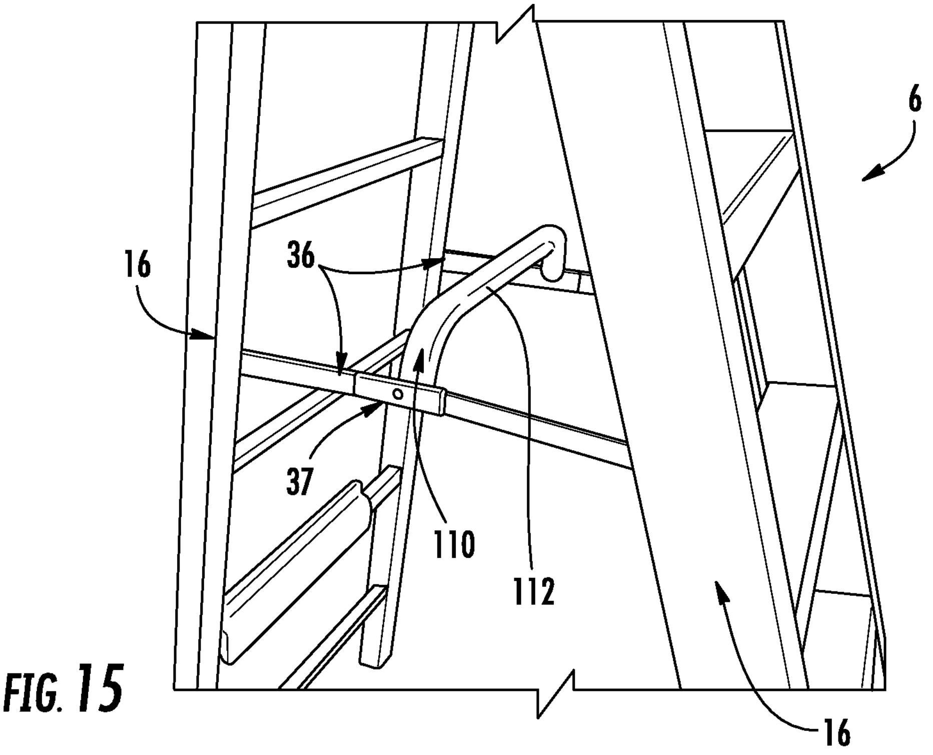
FIG. 15 is perspective view of a ladder, according to an exemplary embodiment.
Figure 16:
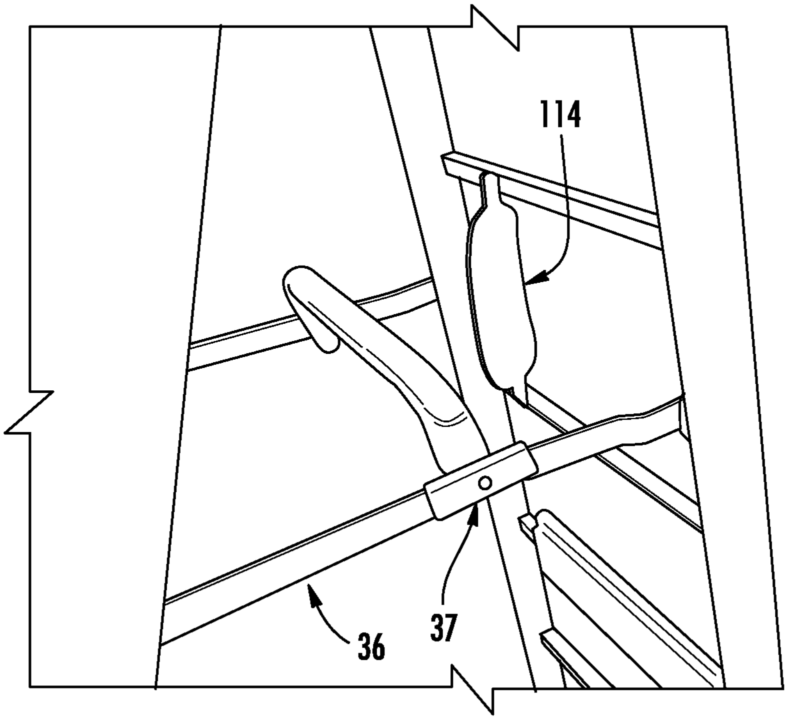
FIG. 16 is perspective view of the ladder of FIG. 15, according to an exemplary embodiment.

Turning to FIGS. 15-16 different aspects of ladder 6 are shown. Ladder 6 is substantially the same as ladder 7, ladder 8, ladder 9, and ladder 10 except for the differences discussed herein. Ladder 6 includes handle 110. Handle 110 can be used to unlock both locking supports 36 at the same time. When ladder 6 is in the opened and locking supports 36 are in the locked position, to close the ladder a user pulls grip 112 of handle 110 upward. Handle 110 raises pivot 37 of locking support 36 and the arms of locking support 36 pivot closed around pivot 37 from the locked open position, as shown in FIG. 15, to the collapsed position. In a specific embodiment, handle 110 extends between locking supports 36, and locking supports 36 extend between the pair of front legs 16 and the pair of back legs 16 (e.g., a first locking support 36 extends between a first front leg and a first back leg, and a second locking support 36 extends between a second front leg and a second back leg).

To secure ladder 6 in the open and locked position, handle 110 can be used to reverse the process. After ladder 6 is placed in the desired location, handle 110 can be used to force pivot 37 downward, opening the arms of locking support 36 until they enter the locked position.

Ladder 6 also comprises shoulder pad 114, which extends between and is coupled to support bars 20. Shoulder pad 114 can be used to carry around ladder 6 when ladder 6 is collapsed.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A ladder configured to couple to a stackable storage unit, the ladder comprising:

a top shelf comprising an upper surface;

a coupling component extending from the upper surface of the top shelf, the coupling component configured to couple the upper surface of the top shelf to the stackable storage unit, the coupling component comprising a first recessed surface, a first rear wall, a first sidewall extending upward from the first recessed surface, a second sidewall extending upward from the first recessed surface, a first rib extending from the first rear wall and the first sidewall above and offset from the first recessed surface, and a second rib extending from the first rear wall and the second sidewall above and offset from the first recessed surface, the second rib distinct from the first rib, the first recessed surface protruding outward from each of the first rear wall, the first sidewall, and the second sidewall, the first rib protruding outward from each of the first rear wall and the first sidewall parallel to and directly above the first recessed surface such that the first rib, the first recessed surface and the first sidewall collectively partially define a first channel that extends horizontally along the first sidewall from a first closed end at the first rear wall to a first open end, and the second rib protruding outward from each of the first rear wall and the second sidewall parallel to and directly above the first recessed surface such that the second rib, the first recessed surface and the second sidewall collectively partially define a second channel that extends horizontally along the second sidewall from a second closed end at the first rear wall to a second open end;

a pair of front legs pivotally coupled to the top shelf;

a plurality of steps extending between the pair of front legs; and a pair of back legs pivotally coupled to the top shelf.

2. The ladder of claim 1, further comprising:

a platform pivotally coupled to the pair of front legs, the platform comprising an upper surface; and a second coupling component extending from the upper surface of the platform, the second coupling component configured to couple the upper surface of the platform to the stackable storage unit, the second coupling component comprising a second recessed surface, a second rear wall, a third sidewall extending upward from the second recessed surface, a fourth sidewall extending upward from the second recessed surface, a third rib extending from the second rear wall and the third sidewall above and offset from the second recessed surface, and a fourth rib extending from the second rear wall and the fourth sidewall above and offset from the second recessed surface, the third rib and the fourth rib distinct from each other, the second recessed surface protruding outward from each of the second rear wall, the third sidewall, and the fourth sidewall, the third rib protruding outward from each of the second rear wall and the third sidewall parallel to and directly above the second recessed surface such that the third rib, the second recessed surface and the third sidewall collectively partially define a third channel that extends horizontally along the third sidewall from a third closed end at the second rear wall to a third open end, and the fourth rib protruding outward from each of the second rear wall and the fourth sidewall parallel to and directly above the second recessed surface such that the fourth rib, the second recessed surface and the fourth sidewall collectively partially define a fourth channel that extends horizontally along the fourth sidewall from a fourth closed end at the second rear wall to a fourth open end.

3. The ladder of claim 1, further comprising:

a padding coupled to a leg of one of the pair of front legs or one of the pair of back legs.

* * * * *